(No Model.) 2 Sheets—Sheet 1.
W. P. HOPKINS.
HEATING APPARATUS FOR WAX THREAD SEWING MACHINES.
No. 544,639. Patented Aug. 13, 1895.
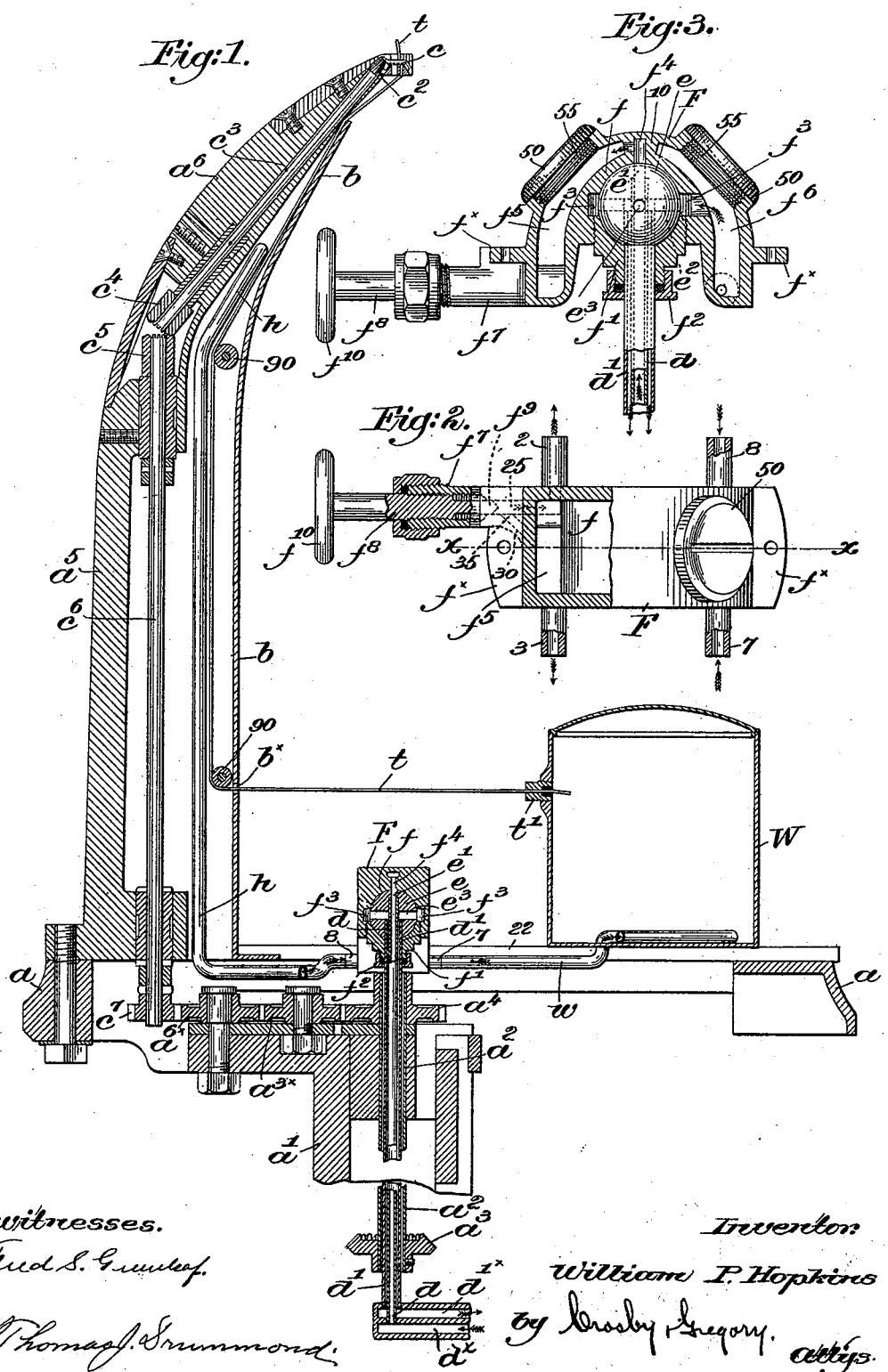

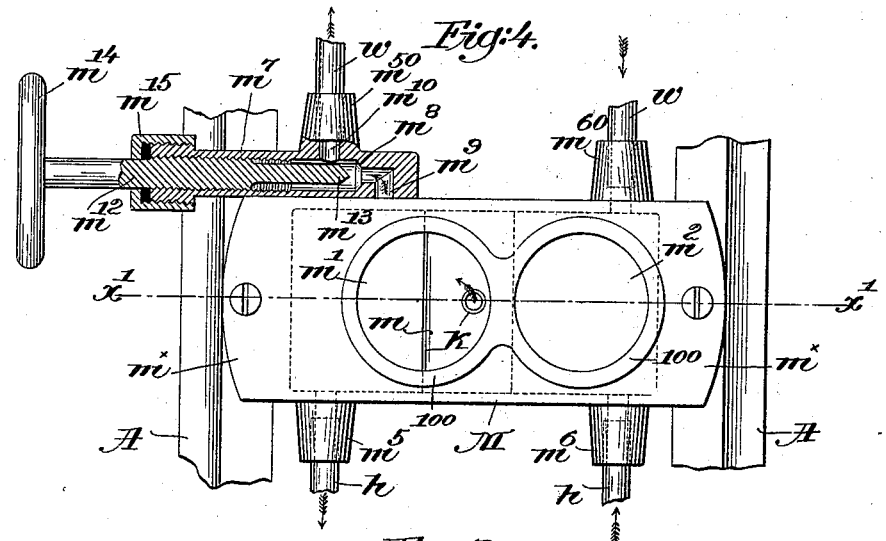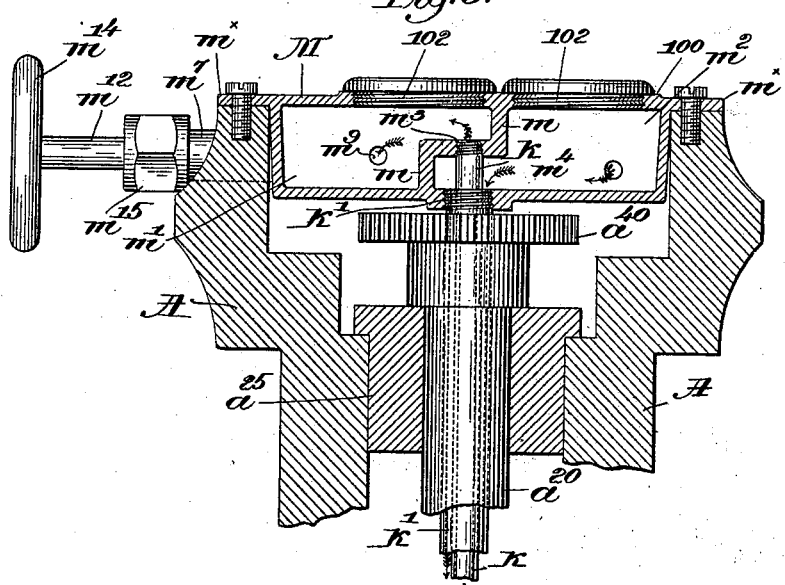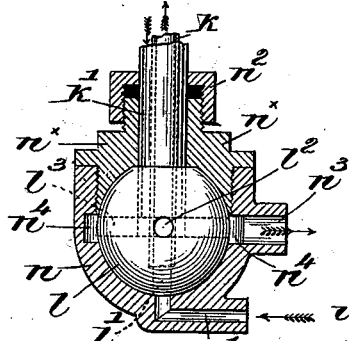

UNITED STATES PATENT OFFICE.

WILLIAM P. HOPKINS, OF LAWRENCE, ASSIGNOR TO FRANK F. STANLEY, TRUSTEE, OF SWAMPSCOTT, MASSACHUSETTS.

HEATING APPARATUS FOR WAX-THREAD SEWING-MACHINES.

SPECIFICATION forming part of Letters Patent No. 544,639, dated August 13, 1895.

Application filed January 15, 1895. Serial No. 534,951. (No model.)

*To all whom it may concern:*

Be it known that I, WILLIAM P. HOPKINS, of Lawrence, county of Essex, State of Massachusetts, have invented an Improvement in Heating Apparatus for Wax-Thread Sewing-Machines, of which the following description, in connection with the accompanying drawings, is a specification, like letters and figures on the drawings representing like parts.

This invention relates to wax-thread sewing-machines provided with a work-supporting horn and a wax-pot mounted upon a rotatable vertical spindle, such as is shown in United States Patent No. 415,064, dated November 12, 1889; and it has for its object the production of means for heating the horn and wax-pot by a suitable medium, preferably steam, circulated through suitable ducts or pipes in such manner that the heating medium is circulated directly to the horn and the wax-pot, the heat communicated to the latter being controlled independently, so that one of such parts may be heated without any reference to the other. Apparatus for heating the horn and wax-pot in machines of the class described have been devised in which the heating medium when exhausted from the horn is utilized to heat the wax-pot, but in such devices the heat transmitted to the wax-pot cannot be regulated independently of the heating of the horn, and as a result when the horn is properly heated the wax-pot is heated entirely too much. If the heat be properly regulated for the wax-pot, the horn will not receive enough, and, furthermore, there is an escape or leakage of the heating medium, particularly when steam is employed. I have devised means for overcoming such objectionable features without interfering in the least with the free rotative movement of the horn and wax-pot upon the horn-spindle, the arrangement being such that both the wax-pot and horn will be provided with the live or direct heating medium, and I have herein shown my invention as applied to a horn and its support substantially such as is shown in United States Patent No. 415,064 referred to, and to which reference may be had.

In accordance therewith my invention consists in a heating apparatus constructed and arranged as hereinafter fully set forth in the specification and particularly pointed out in the claims.

Figure 1 in vertical section shows a sufficient portion of a horn and its supporting-spindle to be understood, with my invention applied thereto, the shank of the horn being broken out to save space, the wax-pot being supported to rotate with the horn. Fig. 2 is a top or plan view, on a larger scale, of the director or separator for the heating medium, partially broken out and in section. Fig. 3 is a vertical sectional view thereof on the line $xx$, Fig. 2. Fig. 4 is a top or plan view, partially in section, of a modified form of receiver and distributer; and Fig. 5 is a vertical section thereof on the line $x'x'$, Fig. 4, the inlet and exhaust pipes being broken out to save space on the drawings.

The head $a$ of the horn, its shank $a'$, the shaft $a^2$, herein shown as hollow, for a purpose to be described, the gear $a^3$ at its lower end, by which to rotate it, the horn-arm composed essentially of the upright part $a^5$ and curved part $a^6$ near the extremity of the horn, the whirl $c$ in the tip of the horn, the teeth $c^2$ at the upper end of the inclined shaft $c^3$, the shaft $c^6$, the meshing crown-gears $c^4$ and $c^5$, fast thereon, the pinion $c^7$ on the lower end of the shaft $c^6$, deriving motion from the pinion $a^4$ at the upper end of the horn-shaft $a^2$ by the intermediate gears $a^{5\times}$ and $a^{6\times}$, and the bearings for the various operating parts are and may be all as common to the United States Patent referred to. I have herein shown the inner or concave side $b$ of the horn as continuous from near the whirl to the top of the head $a$ to retain the heat in the hollow part of the horn.

Referring now particularly to Fig. 1, I have shown two concentric pipes or tubes $d$ and $d'$ extended loosely through the hollow horn-shaft $a^2$ and secured at their lower ends, respectively, to main inlet or supply and outlet or exhaust chambers $d^\times$ and $d'^\times$, and opening into said chambers, live steam or other heating medium being supplied to the chamber $d^\times$, and the chamber $d'^\times$ being provided with a suitable exhaust-outlet. (Not shown.)

The upper ends of the pipes enter and fit tightly in a ball or sphere e, (see Figs. 1 and 3,) having a substantially vertical diametral passage e' in continuation of the pipe d and pierced by two intersecting passages $e^2$ and $e^3$ in a plane at right angles to the passage e' and communicating with the open mouth of the pipe d', the pipe d passing up through their intersection and closing any communication at such point between the pipes or between the passage e' and the passages $e^2$ $e^3$. In Fig. 1 the passage $e^3$ is shown in section, the opening of the passage $e^2$ being hidden by the pipe d, and in Fig. 3 the passage $e^2$ is indicated by dotted lines, the outer end of the passage $e^3$ being seen in elevation. The ball e fits closely but easily in a correspondingly-shaped socket f in the under side of a separator or director F, and is held therein by a cap f' screwed into the mouth of the socket and provided with a suitable stuffing-box $f^2$, the pipe d' passing through said cap and box and fitting closely thereto. Surrounding the ball an annular groove $f^3$ is made in the socket f, with which the passages $e^2$ $e^3$ are at all times in communication, while the passage e' is in constant communication with one end of a duct $f^4$.

F is a casting substantially shaped like an inverted U and provided with ears $f^\times$, by which it is secured to the usual rails 22 of the horn-head a, with a receiving and distributing chamber $f^5$ and a collecting or return chamber $f^6$, separated by a wall 10, Fig. 3, in which the duct $f^4$ is formed, the outlet of the duct opening into the receiving-chamber, which latter is thereby in communication at all times with the inlet or supply pipe d.

Hollow nipples or bosses 2 and 3, communicating with the receiving and distributing chamber $f^5$, are shown as formed on the exterior of the director F, (best shown in Fig. 2,) and like nipples 7 and 8 communicate with the collecting or return chamber $f^6$, and to the nipples 2 and 8 are coupled the ends of a pipe h, led up into the horn, as shown clearly in Fig. 1, as near its upper end as convenient, and bent upon itself to form a return, the heating-fluid passing from the chamber $f^5$ through the nipple 2 and into the pipe h, returning thence and entering the collecting or return chamber $f^6$ through the nipple 8, the direction of flow being clearly indicated by arrows, the outlet side of the pipe h being broken off in Fig. 1 to show the outlet-pipe and nipple 8. The casting F (shown in section in Fig. 1) is in such position that the end thereof having the valve-case $f^7$ would be nearest the eye, viewing said Fig. 1. A second pipe w, connected to the nipple 3, is led into the wax-pot W and bent therein and returned to the director F and connected thereto by the nipple 7, so that the heating medium will pass from the chamber $f^5$ through the nipple 3 and pipe w to and to heat the contents of the wax-pot, returning by the nipple 7 to the collecting or return chamber $f^6$, the outlet side of the pipe w being broken off to show the nipple 7. It will thus be obvious that the live heating medium, entering the receiving-chamber $f^5$ from the pipe d, will be distributed to the horn and wax-pot heating-pipes h and w, respectively, and after performing its work will be returned to and collected in the return-chamber $f^6$, to pass therefrom, by the exhaust-pipe d', to any desired point. This outflow and inflow is uninterrupted, no matter what the position of the horn and wax-pot, rotated on the spindle a' for the inlet-pipe d, and outlet or exhaust pipe d' are, by means of the duct $f^4$ and the annular groove or passage $f^3$ and the several passages in the ball e, always in communication with the distributing and return chambers $f^5$ and $f^6$, respectively, of the director F, the latter being rotatable relatively to the ball e and its attached stationary pipes d and d'. Inasmuch as less heat is required for the wax-pot than for the horn, I have provided a valve for regulating the flow of the heating medium to the wax-pot.

I have formed upon the director F a valve-case $f^7$, its bore being in alignment with one end of the passage 25, (see dotted lines, Fig. 2,) which leads through the nipple 2, an intersecting passage 30, also shown in dotted lines in said figure, connecting it with the chamber $f^5$, the two passages intersecting at 35.

The valve-casing is internally threaded to receive the threaded portion of the stem $f^8$ of a valve $f^9$, which fits tightly the passage 25 beyond its intersection with passage 30, so that when the valve is in the position shown in Figs. 2 and 3 the heating medium may pass unobstructedly from the chamber $f^5$ to the nipple 2. By rotating the hand-wheel $f^{10}$, however, the valve may be moved in to more or less cover the intersection or port 35, and thus regulate or shut off entirely the flow to the wax-pot without affecting the flow of the medium to the horn.

In order to more readily form the various passages in the director F, I preferably cast it with the openings 50, which are subsequently closed by suitable screw-plugs 55.

The valve-casing $f^7$, is provided with a stuffing-box of usual construction.

The thread t passes from the wax-pot W through a suitable stripper t' and through an opening $b^\times$ in the inner or concave side b of the horn, and thence around suitable guide-rolls 90 to the whirl c.

In the construction shown in Figs. 1 to 3, inclusive, the director is rigidly secured to and moves with the head a of the horn-spindle, the supply and exhaust pipes d and d' being held stationary and operatively connected with the distributing and return chambers $f^5$ and $f^6$ of said director, as fully described.

In Figs. 4 and 5 I have shown a modified form of director, which is rigidly secured to and to rotate with the head a of the horn; but the concentric supply and exhaust pipes for the heating medium are rigidly attached to and to rotate with the director, the lower ends of the said pipes being connected by a ball-and-socket joint, very similar to the one hereinbefore described, to the main supply and exhaust.

Referring now to Figs. 4 and 5, the director M is divided by an irregular wall $m$ into distributing and collecting or return chambers $m'$ and $m^2$, respectively, the said director M being provided with suitable flanges $m^\times$, by which it is secured to the upper end of the horn-spindle A.

The hollow shaft $a^{20}$, supported in a suitable bearing $a^{25}$ and having fast thereon at its upper end a gear $a^{40}$, corresponds in function to the hollow shaft $a^2$ hereinbefore described.

Concentric supply and exhaust pipes $k$ and $k'$, respectively, are extended loosely through the hollow shaft $a^{20}$ and are threaded at their upper ends to screw into similar threaded openings $m^3$ and $m^4$ in the dividing-walls $m$ and the bottom, respectively, of the director M, so that the upper end of the supply-pipe $k$ opens directly into the chamber $m'$ and the upper end of the pipe $k'$ opens into the collecting or return chamber $m^2$. The lower ends of the said pipes enter and are closely fitted into a ball $l$, having a passage $l'$, continuing from the open lower end of the pipe $k$ to the exterior of the ball to form an inlet-port concentric to the vertical center about which the horn-spindle rotates, the said port opening directly into the inlet-passage $n'$ of a socket $n$, having a substantially hemispherical recess therein to receive snugly the ball $l$, yet permit it to be rotated therein about a vertical axis, a cap $n^\times$, provided with a suitable stuffing-box $n^2$, being screwed into the socket $n$ and surrounding the exhaust-pipe $k'$.

The lower end of the exhaust-pipe is in constant communication with the inner ends of the radial passages $l^2\, l^3$ in the ball $l$, said passages extending to the surface of the ball and forming ports which are in constant communication with the outlet-port $n^3$ of the socket $n$ by means of an annular recess or chamber $n^4$ in the inner wall of said socket and in the plane of the radial passages.

The heating medium is admitted from a source of supply (not shown) into the inlet-port $n'$ of the socket, passing thence through the passage $l'$ of the ball into and through the supply-pipe $k$ to the distributing-chamber $m'$ of the director M, while the exhaust or return of the heating medium is collected in the return-chamber $m^2$ of the said director, and will pass therefrom through the exhaust-pipe $k'$ out through the passages $l^2\, l^3$ in the ball into the annular chamber $n^4$, and thence through the outlet $n^3$ of the socket to any suitable point of discharge. This will be so, no matter whether the horn-spindle be rotated or not, for the inlet and outlet ports of the ball $l$ will always be in communication with the inlet and outlet ports of the socket $n$. In this construction any condensate forming in the return-chamber $m^2$ will flow directly to and into the open upper end of the exhaust-pipe $k'$, to be carried off thereby.

The casting forming the director M is provided with hollow nipples $m^5$ and $m^6$, opening, respectively, into the chambers $m'$ and $m^2$, and to these nipples are connected the ends of the horn-heating pipe $h$ hereinbefore described, so that the heating medium will pass from the distributing-chamber $m'$ through said heating-pipe and will return or be exhausted into the return-chamber $m^2$. A valve-casing $m^7$ is formed on the opposite side of the director, having a valve-seat $m^8$ therein in communication by passage $m^9$ with the distributing-chamber $m'$, and beyond the said valve-seat a nipple $m^{50}$ is formed, having a passage $m^{10}$ therethrough communicating with the interior of the valve-casing.

The shank $m^{12}$ of the valve $m^{13}$ is shown as threaded (see Fig. 4) to engage the interiorly-threaded portion of the casing. Rotation of the valve-stem by means of the hand-wheel or other device $m^{14}$ in one or the other direction will move the valve $m^{13}$ toward or away from its seat $m^8$ to regulate or to entirely close the passage $m^9$.

The ends of the wax-pot heating-pipe $w$ are suitably connected to the nipples $m^{50}$ and $m^{60}$, the latter communicating with the chamber $m^2$, so that when the valve $m^{13}$ is open the heating medium can pass from the distributing-chamber $m'$ through the nipple $m^{50}$ into the pipe $w$ to heat the wax-pot, exhausting through nipple $m^{60}$ into the return-chamber $m^2$. It will be noticed that in Figs. 4 and 5 the director M would be placed upon the head shown in Fig. 1 in such manner that the hand-wheel $m^{14}$ would be farthest from the eye.

The valve-casing $m^7$ is provided with a suitable stuffing-box $m^{15}$ for the valve-stem to pass through in order to prevent any leakage, and to more conveniently fashion the director M, I have shown it as provided with screw-threaded openings 100, which are finally hermetically closed by suitable screw-threaded plugs 102. (See Fig. 5.) It will be understood that the socket $n$ is to be secured to some stationary or non-rotating part of the apparatus and that its ports will be suitably coupled with the source of heating supply and with the points of exhaust therefor.

The construction of the heating apparatus, as shown in Figs. 1, 2, and 3, is readily adapted to machines such as shown in United States Patent hereinbefore referred to by simple substitution of a hollow shaft for the solid shaft $a^2$ (shown in said patent) and by a slight change in the location and form of the wax-pot, although the construction of the latter is immaterial, so long as it can receive the heating-pipe $w$.

By an inspection of the various drawings it will be obvious that the horn and wax-pot will be heated by a direct application thereto of the heating medium, whatever it may be, I preferring, however, to use steam, and that the admission of the heat to the wax-pot is regulated and controlled or altogether shut off without having any effect whatever upon the heat transmitted to the horn.

The exhaust from both the horn and the wax-pot heating-coils is collected in the return-chamber of the director and conveyed therefrom through the exhaust-pipes, together with any condensate that may form.

So far as I am aware it is broadly new to mount a director for the heating medium rigidly upon the spindle-head or part rotatable therewith, the wax-pot and horn being heated therefrom by independently-controlled pipes.

From a comparison of the construction shown in Figs. 1 and 5 it will be obvious that it is entirely immaterial whether the main supply and exhaust ports for the director are located adjacent to the latter, as in Fig. 1, at the upper end of the concentric supply and exhaust pipes, or at the lower ends of such pipes, as shown in Fig. 5.

I claim—

1. A rotatable spindle, and a horn arm, wax-pot and a chambered director for the heating medium mounted upon and to rotate with the spindle, combined with circulatory heating pipes for the horn and wax-pot respectively, each connected with the distributing and the return chambers of the director, and supply and exhaust pipes in continuous communication with the distributing and return chambers respectively, whereby live heating medium is supplied to the horn and wax-pot independently, substantially as described.

2. A horn arm, a wax-pot, rotatably movable in unison therewith, a separate circulatory heating pipe for each, each of said pipes being connected at its ends with the distributing and return chambers of a director for the heating medium, and a rotatable spindle for and upon which said arm and pot are supported, combined with a director mounted to rotate with said spindle, a stationary main supply and exhaust, and connecting pipes intermediate said supply and exhaust and the director, rigidly secured to one of said parts, and by a ball and socket joint with the other of said parts, whereby continuous circulation of the heating medium is established, substantially as described.

3. A horn arm, a wax-pot, rotatably movable in unison therewith, a separate circulatory heating pipe for each, each of said pipes being connected at its ends with the distributing and return chambers of a director for the heating medium, and a rotatable spindle for and upon which said arm and pot are supported, combined with a director mounted to rotate with said spindle, and a stationary main supply and exhaust, a socket in one of said parts co-operating with a ball fast on the adjacent ends of concentric pipes rigidly secured to and opening into the other of said parts, passages in the ball connecting the adjacent ends of the pipes with inlet and outlet ports respectively in the socket, whereby continuous circulation of the heating medium is established, substantially as described.

4. A horn arm, a wax-pot, rotatably movable in unison therewith, a separate circulatory heating pipe for each, each of said pipes being connected at its ends with the distributing and return chambers of a director for the heating medium, and a rotatable spindle for and upon which said arm and pot are supported, combined with a director mounted to rotate with said spindle, a stationary main supply and exhaust, connecting pipes intermediate said supply and exhaust and the director, rigidly secured to one of said parts, and by a ball and socket joint with the other of said parts, and a controlling valve for the wax-pot heating pipe, to regulate the supply of heat thereto, substantially as described.

5. A rotatable spindle, a horn arm and wax-pot carried thereby, and a chambered director for the heating medium rigidly mounted above the axis of the spindle, combined with circulatory heating pipes for the horn and wax-pot respectively, each connected with the distributing and the return chambers of said director, and concentric supply and exhaust pipes extended through the spindle, each in continuous communication with one of the chambers of the receiver, substantially as described.

6. A rotatable spindle, a horn arm and wax-pot carried thereby, and a chambered director for the heating medium rigidly mounted above the axis of the spindle, combined with circulatory heating pipes for the horn and wax-pot respectively, each connected with the distributing and the return chambers of said director, a stationary main supply and exhaust, and concentric supply and exhaust pipes extended through the spindle, a ball and socket joint and a fixed joint connecting the opposite ends of the pipes with the main supply and exhaust and with the director, whereby continuous circulation of the heating medium is established, substantially as described.

7. A rotatable spindle, a horn arm and wax-pot carried thereby, and a chambered director for the heating medium rigidly mounted above the axis of the spindle, combined with circulatory heating pipes for the horn and wax-pot respectively, each connected with the distributing and the return chambers of said director, a hollow horn shaft extended through the spindle, and concentric supply and exhaust pipes extended through said hollow shaft, each in continuous communication with one of the chambers of the receiver, substantially as described.

In testimony whereof I have signed my name to this specification in the presence of two subscribing witnesses.

WILLIAM P. HOPKINS.

Witnesses:
 WILBUR E. ROWELL,
 ARETAS R. SANBORN.